US012552303B2

(12) United States Patent
Wang et al.

(10) Patent No.: US 12,552,303 B2
(45) Date of Patent: Feb. 17, 2026

(54) TRIM SEAM REINFORCEMENT

(71) Applicant: Lear Corporation, Southfield, MI (US)

(72) Inventors: Qichao Wang, Shanghai (CN); Chandrashekar Simha, Shanghai (CN); Yong Yang, Shanghai (CN); Jiajun Li, Shanghai (CN); Jie Ni, Shanghai (CN); Wenjuan Yang, Shanghai (CN); Haipeng Weng, Shanghai (CN)

(73) Assignee: Lear Corporation, Southfield, MI (US)

( * ) Notice: Subject to any disclaimer, the term of this patent is extended or adjusted under 35 U.S.C. 154(b) by 236 days.

(21) Appl. No.: 18/243,961

(22) Filed: Sep. 8, 2023

(65) Prior Publication Data

US 2024/0208383 A1 Jun. 27, 2024

(30) Foreign Application Priority Data

Dec. 27, 2022 (CN) .......................... 202211688036.4

(51) Int. Cl.
*B60N 2/02* (2006.01)
*B60N 2/56* (2006.01)
*B60N 2/58* (2006.01)
*B60N 2/90* (2018.01)

(52) U.S. Cl.
CPC ......... *B60N 2/5816* (2013.01); *B60N 2/0284* (2013.01); *B60N 2/5685* (2013.01); *B60N 2/58* (2013.01); *B60N 2/5858* (2013.01); *B60N 2/99* (2018.02); *B60N 2002/0288* (2013.01)

(58) Field of Classification Search
CPC .......... B60N 2/0284; B60N 2002/0288; B60N 2/58; B60N 2/5816
See application file for complete search history.

(56) References Cited

U.S. PATENT DOCUMENTS

| | | | | |
|---|---|---|---|---|
| 4,773,703 A | * | 9/1988 | Krugener | B60N 2/0284 297/284.3 |
| 6,592,181 B2 | | 7/2003 | Stiller et al. | |
| 7,597,398 B2 | * | 10/2009 | Lindsay | B60N 2/62 297/284.11 X |
| 8,814,267 B2 | | 8/2014 | Welch, Sr. et al. | |
| 9,039,085 B2 | * | 5/2015 | Aselage | B60N 2/0284 297/284.3 |
| 9,199,564 B2 | | 12/2015 | Clauser et al. | |
| 9,315,132 B2 | * | 4/2016 | Mabashi | B60N 2/5685 |
| 9,421,885 B2 | * | 8/2016 | Wiegelmann | B60N 2/0284 |
| 9,896,009 B2 | * | 2/2018 | An | B60N 2/64 |
| 9,937,835 B1 | * | 4/2018 | Khalid | B60N 2/643 |

(Continued)

FOREIGN PATENT DOCUMENTS

| | | | | |
|---|---|---|---|---|
| DE | 102011121579 A1 | * | 6/2013 | ............... B60N 2/62 |
| DE | 102011121582 A1 | * | 6/2013 | ............... B60N 2/58 |
| EP | 3763560 A1 | * | 1/2021 | ........... B60N 2/0284 |

*Primary Examiner* — Rodney B White
(74) *Attorney, Agent, or Firm* — Brooks Kushman P.C.

(57) ABSTRACT

Trim covers with reinforcing assemblies for providing straight seams and smooth/symmetrical trim surfaces along one or more seams. For example, the trim covers may employ one or more wires arranged along or proximate the one or more seams such that the seams are straight and not wavy. In one or more embodiments, the trim cover may also employ one or more elastic members to provide tension to the surface such that it does not wrinkle and/or sag.

20 Claims, 4 Drawing Sheets

(56) References Cited

U.S. PATENT DOCUMENTS

| | | | |
|---|---|---|---|
| 10,328,828 B2 | 6/2019 | Fujikake et al. | |
| 10,471,851 B2* | 11/2019 | Ioppolo | B60N 2/02253 |
| 11,059,407 B2* | 7/2021 | Tait | B60N 2/0284 |
| 11,325,509 B2* | 5/2022 | Panchani | B60N 2/0284 |
| 11,938,845 B2* | 3/2024 | Kimbara | B60N 2/58 |
| 11,981,232 B2* | 5/2024 | Riva | B60N 2/5816 |
| 2025/0001907 A1* | 1/2025 | Seibold | B60N 2/02 |
| 2025/0033534 A1* | 1/2025 | Bashir | B60N 2/7094 |

* cited by examiner

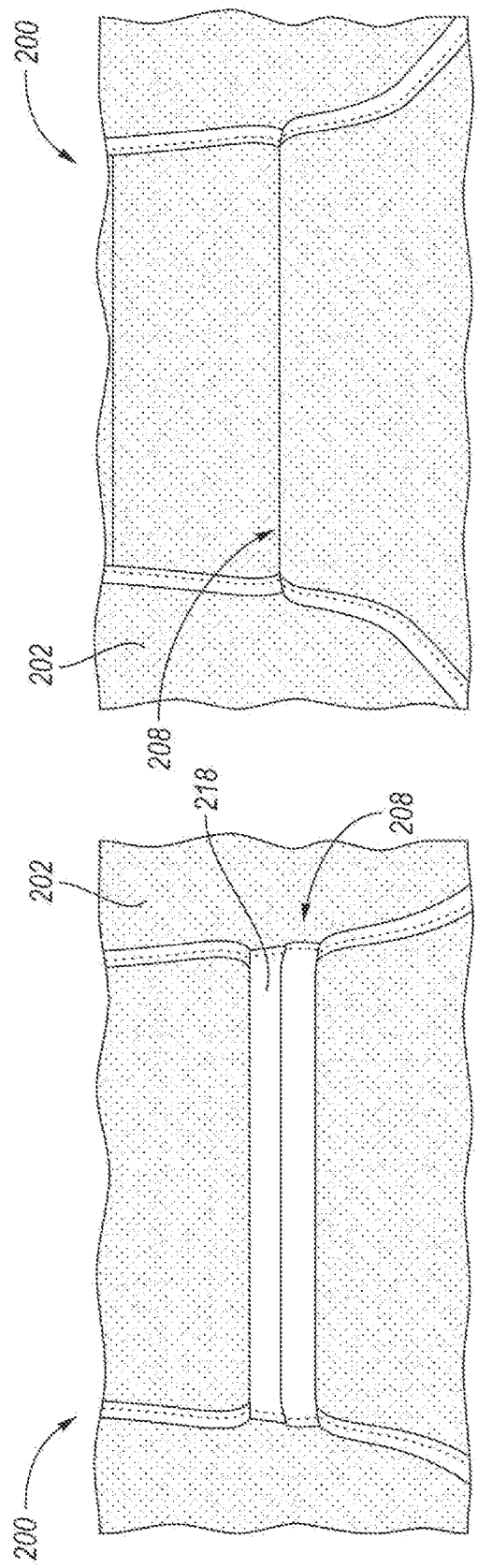
FIG. 5
FIG. 6
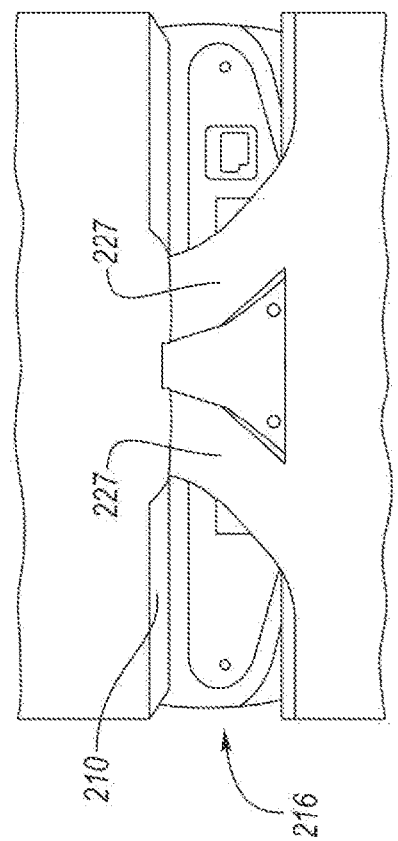
FIG. 7

TRIM SEAM REINFORCEMENT

CROSS-REFERENCE TO RELATED APPLICATIONS

This application claims foreign priority benefits under 35 U.S.C. § 119(a)-(d) to CN application number 2022 116 880 364, filed Dec. 27, 2022, which is incorporated by reference in its entirety.

TECHNICAL FIELD

The present disclosure relates to trim covers such as for seat assemblies or more specifically vehicle seat assemblies employing heat mats and/or massaging/ventilation assemblies.

BRIEF DESCRIPTION OF THE DRAWINGS

FIG. 5 is a top view of a seam of an embodiment of a seat assembly in an extended position.

FIG. 6 is a top view of the seam in a retracted position.

FIG. 7 is a top view of a heat mat bridging a gap of the seat assembly.

DETAILED DESCRIPTION

Figure 1:
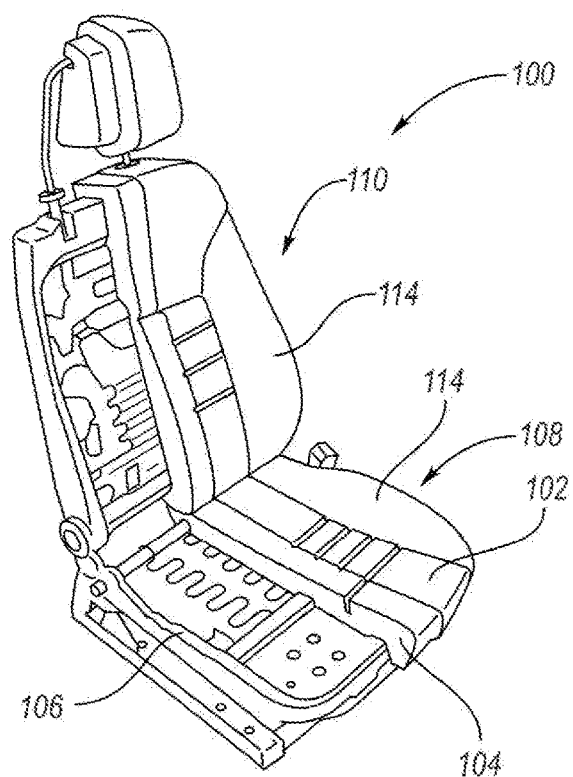
FIG. 1 is a perspective view and partial cross-sectional view of an embodiment of a seat assembly.

Embodiments of the present disclosure are described herein. It is to be understood, however, that the disclosed embodiments are merely examples and other embodiments can take various and alternative forms. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight; the term "polymer" includes "oligomer," "copolymer," "terpolymer," and the like. The description of a group or class of materials as suitable or preferred for given purpose implies the mixtures of any two or more of the members of the group or class are equally suitable or preferred. Molecular weights provided for any polymers refers to number average molecular weight. A description of constituents in chemical terms refers to the constituents at the time of addition to any combination specified in the description and does not necessarily preclude chemical interactions among the constituents of a mixture once mixed. The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

The term "substantially" or "generally" may be used herein to describe disclosed or claimed embodiments. The term "substantially" may modify a value or relative characteristic disclosed or claimed in the present disclosure. In such instances, "substantially" or "generally" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Referring to FIG. 1, a seat assembly 100 such as for a vehicle (e.g., motorcycle, automobile, watercraft, aircraft, or locomotive) is provided. In one or more embodiments, the seat assembly 100 includes a trim cover 102 having a reinforcing assembly disposed over a cushion assembly 104. The reinforcing assembly ensures the trim cover 102 is smooth and symmetrical. In a refinement, the cushion assembly 104 is supported by a frame 106. In a variation, the frame 106 supports an occupant. In a refinement, the frame 106 supports other components such as a massaging assembly, a ventilation assembly, a temperature control assembly, a sensor assembly, and/or an electronic assembly 112. In various embodiments, the seat assembly 100 includes a seat bottom 108 and a seat back 110. In a variation, the seat bottom 108 and/or seat back 110 includes bolsters 114.

Figure 2:
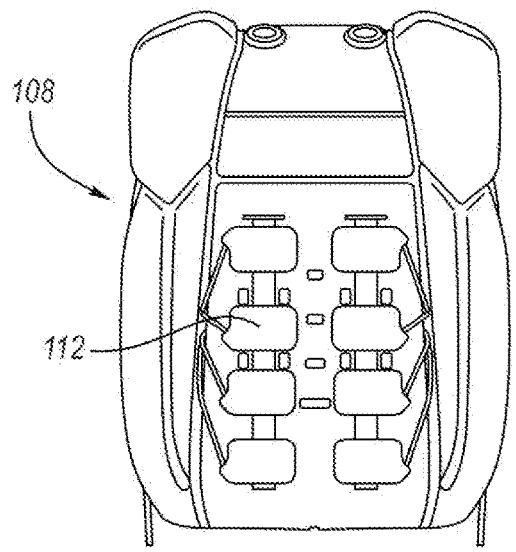
FIG. 2 is a front view of another embodiment of a subassembly such as a massaging/ventilation assembly.
Figure 3:
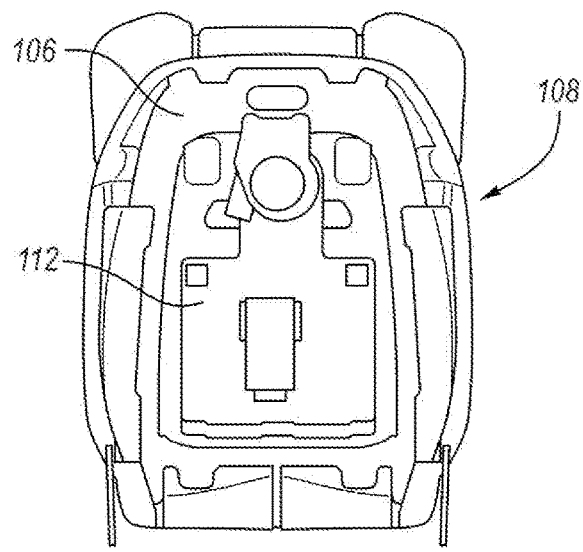
FIG. 3 is a back view of the seat assembly having a subassembly.

In various embodiments, the seat frame 106 is made of a rigid material such as metal, plastic, wood, or a combination thereof. For example, a steel and/or aluminum seat frame 106 is used. The cushion assembly 104 includes one or more cushions. In various embodiments, the cushion assembly defines one or more gaps. For example, a center/core/middle cushion and bolster cushions and/or two cushions of the seat bottom define one or more gaps therebetween (e.g., a first gap and/or a second gap). In a variation, the cushions are moveable relative to each other to expand or contract the gaps. In a refinement, the one or more gaps provide a passage or communication channel to and from opposite sides of the cushions to facilitate numerous components. In various embodiments, the cushions are foam and/or a plurality of polymeric strands. In a refinement, the cushion assembly and cushions define a gap. In various embodiments, the trim cover 102 is configured to be adjacent a seated occupant, i.e., the trim cover 102 includes the outermost layer defining an outermost surface. In a variation, the trim cover 102 covers the subassembly 112, as shown in FIGS. 2-3. In a refinement, the trim cover 102 includes a fabric, woven fabric, faux leather, or leather surface. For example, trim cover 102 includes cotton, polyester, polyurethane, nylon, or any other suitable material.

Referring to FIGS. 4-9, the trim cover 200 includes a trim material 202 defining an outer surface 204 and an inner surface 206 opposite the outer surface 204. In a variation, the trim material 202 is perforated (i.e., includes a plurality of perforations). In a refinement, the outer surface is configured to contact an occupant. In various embodiments, the trim cover 200 defines one or more seams 208. In a variation, the inner surface 206 contacts a cushion assembly 210 and one or more subassemblies. In one or more embodiments, the cushion assembly 210 defines an occupant support surface 214 and one or more gaps 216.

Figure 4:
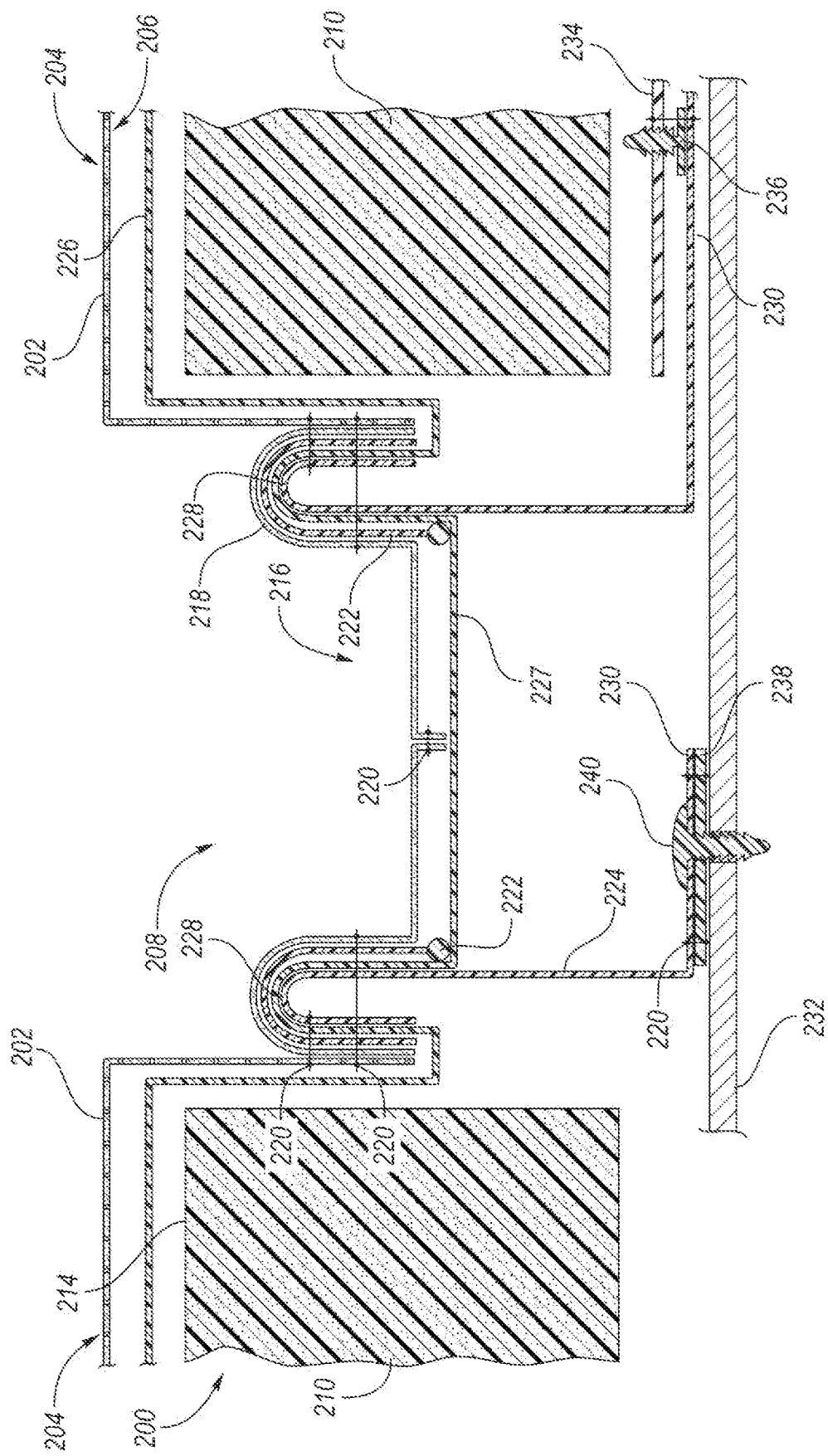
FIG. 4 is schematic of an embodiment of a trim assembly for a seat.

In a refinement, a heat mat 226 is disposed between the trim material 202 and the cushion assembly 210. In various embodiments, the heat mat 226 includes one or more bridges 227 arranged to bridge the one or more seams 208 and/or gaps 216 as shown in FIGS. 4 and 7. When a heat mat 226 is disposed below the trim cover 200 such as in FIG. 5, the trim cover 200 cannot be fixed to the underlying components along the area of heat mat, which creates difficulty in providing straight seams and eliminating sagging and/or wrinkling.

In one or more embodiments, the one or more seams 208 and one or more gaps 216 allow and/or facilitate moving the trim cover 200 (and seat assembly) from a first position, as shown in FIG. 5, to a second position, as shown in FIG. 6 and vice versa. For example, the first position (FIG. 5) is an extended position, and the second position is a retracted position (FIG. 6). In a refinement, the extended and retracted positions allow an occupant to adjust the seat assembly and trim cover to accommodate specific limb (e.g., leg) lengths (e.g., an extended leg position and a retracted leg position).

In a variation, the one or more seams 208 are configured to be disposed over the one more gaps 216 (i.e., bridge the one or more gaps). In one or more embodiment, each seam 208 includes a connector (e.g., crumb catcher) 218 disposed along the gap between the cushions. The connector 218 may cooperate with the remaining portion of the trim material 202. In a variation, the connector 218 is bonded or attached to the remaining portion of the trim material 202. For example, the connector 218 and trim material 202 are sewn together with thread 220. In various embodiments, the connector 218 cooperates with various components and subassemblies not readily visible when the seat assembly is assembled such that the one or more seams 208 appear consistent and appealing even when the seat is moved into different positions. In one or more embodiments, the connector 218 is disposed over the gap when the seat assembly is in a first (extended) position such that it may contact a seated occupant and is disposed in the gap such that at least a portion of it is not in contact with a seated occupant when the seat assembly is in a second (retracted) position. Said differently, when the seat assembly 100 is moved from a retracted position to an extended position the connector 218 advances from within to the gap 216 to extend over or adjacent the gap 216 and when the seat assembly 100 is moved from the extended position to the retracted position the connector 218 withdraws from adjacent/above the gap 216 to within the gap 216. In a refinement, the connector 218 is not perforated (i.e., has no perforations). In various embodiments, the connector 218 includes a plurality of fabric swatches such as a first and second fabric swatches that are bonded or attached together. For example, the first and second fabric swatches are sewn together by thread 220.

In one or more embodiments, the connector 218 cooperates with one or more (e.g., a first and second) rigid members 222. In various embodiments, the rigid members 222 are wires (e.g., elongated metal wires). In a refinement, the rigid member 222 reinforces the trim material 202 and/or connector 218. In a variation, the one or more rigid members 222 are proximate the one or more seams 208. In a refinement, the one or more rigid members 222 provides stress or tension to the trim material 202 and/or connector 218 (e.g., by extending, stretching, or pulling) such that it is straight (not wavy) and does not sag and/or wrinkle. For example, the rigid member 222 reinforces, stresses, provides tension, extends, stretches, and/or pulls the trim material 202 and/or connector 218 while the trim cover 200 is in the first and second positions.

In various embodiments, a subordinate layer 224 such as a fabric layer (e.g., anti-noise fabric) is disposed below the connector 218 opposite the outer surface 202 such that the rigid member 222 is disposed or sandwiched between the connector 218 and the subordinate layer 224. In one or more embodiments, the subordinate layer 224 includes a plurality fragments (e.g., a first and second fragment) such as fabric fragments. In various embodiments, each fragment has a first end 228 and a second end 230. In a refinement, the first end 228 cooperates with the trim material 202 and/or connector 218. For example, the first end 228 is bonded or attached to the trim material 202 and/or connector 218 such as by being sewn with thread 220. In a variation, the second end 230 cooperates with a support such as the frame 232 or a plastic component 234 such as a cushion extender. In a refinement, the second end 230 is bonded or attached to the support by one or more retainers. For example, the second end 230 is attached to the frame by clip retainer 236, flat retainer 238, and/or Christmas tree clip 240. In at least one embodiment, the second end of a first fragment is attached to the frame 232 by a flat retainer 238 and a Christmas tree clip 240 and the second end of a second fragment is attached to the plastic component 234 by a clip retainer 236.

Figure 8:
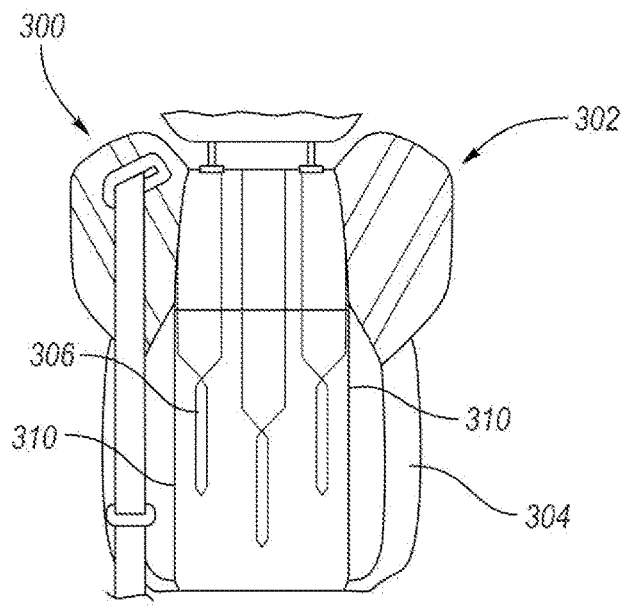
FIG. 8 is a front view of a second embodiment of a seat assembly.
Figure 9:
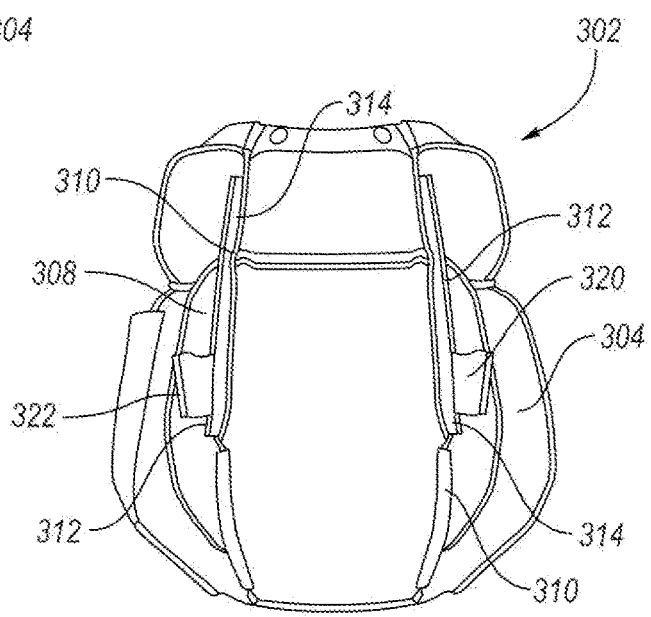
FIG. 9 is an interior view of a trim assembly removed from the second embodiment of the seat assembly.

Referring to FIGS. 8-9, a trim cover 302 is shown, according to another embodiment. The trim material 304 of the trim cover 302 defines an outer surface 306, an inner surface 308 opposite the outer surface 306, and one or more seams 310. In a refinement, the outer surface 306 is configured to contact an occupant. In a variation, the trim cover 302 covers a subassembly (e.g., a massaging and/or ventilation assembly) of the seat assembly 300 when the trim cover 302 is disposed over a seat assembly 300, for example, as described above and shown in FIGS. 2-3. In a refinement, the inner surface 308 contacts a cushion assembly and/or the subassembly. In various embodiments, the cushion assembly defines one or more gaps and an occupant support surface. For example, a center/core/middle cushion and bolster cushions of the cushion assembly define one or more gaps therebetween (e.g., first and second gaps). In a variation, the cushions are moveable relative to each other to expand, enlarge, contract, reduce, and narrow the gaps. In a refinement, the one or more gaps provide a passage or communication channel to and from opposite sides of the cushions to facilitate numerous components. In one or more embodiments, the one or more seams 310 are positioned to extend over the one or more gaps. In a variation, one or more rigid members 312 are disposed on or in the trim material 304 and proximate a corresponding seam. In a refinement, the one or more rigid members 312 are wires such as elongated metal wires.

Figure 10:
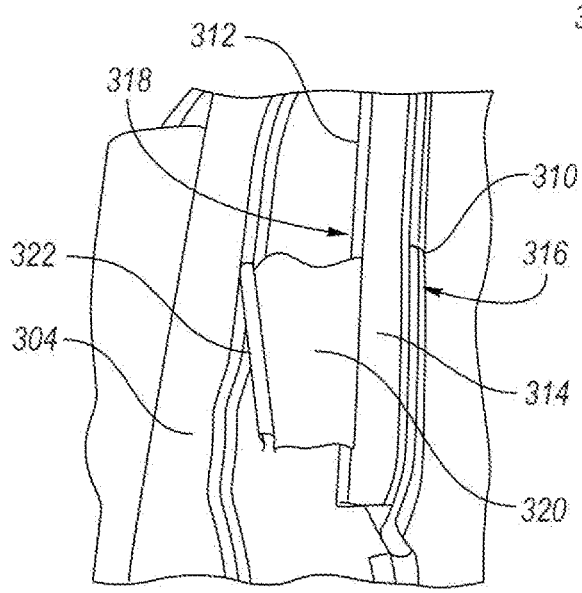
FIG. 10 is an enlarged view of a reinforcement assembly of the second embodiment of the trim assembly.

In various embodiments, as shown in FIGS. 9-10, each rigid member 312 is disposed on a flap 314. In at least one embodiment, the flap 314 extends and/or cooperates with the inner surface 308. For example, the flap 314 extend from or is attached to the inner surface 308 of the trim material 304 at a first end 316 and the rigid member 312 is disposed at a second end 318 of the flap 314 opposite the first end 316. In a refinement, the second end 318 cooperates with an elastic member 320 such as an elastic fabric (e.g., CarTex). For example, the elastic member 320 is attached to the rigid member 312 and/or the second end 318 of the flap 314. In various embodiments, the rigid member 312 and/or elastic member 320 reinforce the trim cover 302 such as providing tension or stress to the trim cover 302. In a refinement, the reinforcement, tension, and/or stress eliminates wavy seams and wrinkles and/or provides a straight, smooth, and consistent appearance to the outer surface 306 and along the seam.

In one or more embodiments, a retainer 322, disposed opposite the flap 314/rigid member 312, cooperates with each elastic member 320 and is configured to cooperate with a portion of the seat assembly such that it pulls on the elastic member 320 to provide the tension and/or stress. For example, the retainer 322 is a J-hook that couples to a portion of the seat assembly such as the frame or a back portion of the cushion assembly opposite the occupant support surface. In other words, the elastic member 320 is disposed between the rigid member 312 and the retainer 322. In a refinement, the retainer 322 includes a polymeric material such as plastic such that it flexes slightly under the stress of moving the seat assembly and trim cover from a first position to a second position.

In at least some embodiment, the one or more elastic members 320 are disposed or extends through the one or more gaps defined by the cushion assembly such that the trim cover 302 cooperates with a support such as the frame, plastic support (e.g., carrier board), or even the backside of a cushion via the combination of the flap 314, elastic member 320, and retainer 322. In are refinement, a subassembly such as a massaging and/or ventilation subassembly having one or more fluid passages (e.g., pneumatic hoses) that pass through the gap for passing a fluid (e.g., air) to massaging bladders or a vent is included. In various embodiments, the rigid member 312 is longer than the elastic member (i.e., the rigid member 312 has a greater dimension such as a greater length than an equivalent dimension of the elastic member 320). The difference in dimensions allows other components to also occupy or utilize the gap while still reinforcing or providing tension/stress to the trim cover along the length of the seam. For example, the seams using this reinforcement assembly are straight and the outer surface 306 has an unwrinkled appearance in various positions, such as a first position when one or more bladders of the massaging assembly are inflated and a second position when one or more of the bladders of the massaging assembly are deflated. When the bladders are inflated and deflated they apply different pressures and stresses on the trim cover 302. It should be understood that in various embodiments, the trim cover 302/trim material 304 defines a plurality of seams 310 and accordingly, includes a plurality of the above reinforcing assemblies (e.g., a plurality of flaps 314, a plurality of rigid members 312, a plurality of elastic members 320, and a plurality of retainers corresponding to the plurality of seams).

According to a first aspect of the trim covers and assemblies described herein, the trim cover includes a trim material comprising an outer surface configured to contact an occupant, an inner surface opposite the outer surface configured to contact a cushion assembly and a seam. The cushion assembly defines an occupant surface and a gap. The seam is configured or positioned to extend over the gap. The trim cover also includes a rigid member positioned proximate the seam and configured to provide stress on the trim material such rigid material reinforces the seam by tension the trim material in a first position and a second position. The trim material being configured to move from the first position to the second position and vice versa.

According to a second aspect, the trim cover of the first aspect or any of the following aspects further includes an elastic member cooperating with the rigid member. The elastic member is configured to be coupled to a seat assembly to apply tension to the trim material via the rigid member.

According to a third aspect, the trim cover of any of the prior or subsequent aspects also includes a retainer opposite the rigid member with an elastic member disposed therebetween. The retainer is configured to be coupled to a seat frame of a seat assembly and the elastic member extends through the gap when the trim material is arranged on the seat assembly.

According to a fourth aspect, the trim cover of any of the prior or subsequent aspects includes a plurality of retainers cooperating with the inner surface of the trim material such that one or more retainers cooperate with the rigid member when arranged on a seat assembly to apply tension to the trim material proximate the gap.

According to a fifth aspect, the rigid member of any of the prior or subsequent aspects is disposed on or in the trim material.

According to a sixth aspect, the rigid member of any of the prior or subsequent aspects is a wire.

According to a seventh aspect, the assembly of any of the prior or subsequent aspects is a seat assembly. The seat assembly includes a frame, a cushion assembly, and a trim cover. The cushion assembly is supported by the frame and the trim cover covers the cushion assembly.

According to an eighth aspect, the assembly of any of the prior or subsequent aspects includes a heat mat bridging the gap defined by the cushion assembly.

According to a ninth aspect, the assembly of any of the prior or subsequent aspects is a seat assembly. The seat assembly includes a frame, a cushion assembly, and a trim cover. The seat assembly and trim cover being configured to move form a first position to a second position. The cushion assembly is supported by the frame and defines a gap. The trim cover is disposed over the cushion assembly. The trim cover defines a seam disposed adjacent the gap and a rigid member extending along the seam. The rigid member applies a tension to support the seam when the trim cover is in the first position and the second position.

According to a tenth aspect, the assembly of any of the prior or subsequent aspects includes a massaging assembly disposed below the trim cover and extending through the gap or a heat mat disposed below the trim cover and bridging the gap.

According to an eleventh aspect, the first position of any of the prior or subsequent aspects is an inflated position or an extended position and the second position is a deflated position or a retracted position.

According to a twelfth aspect, the first position of any of the prior or subsequent aspects is an extended leg support position, and the second position is a retracted leg support position.

According to a thirteenth aspect, the assembly of any of the prior or subsequent aspects includes an elastic member cooperating with the rigid member and the frame to apply a tension such that the trim cover remains unwrinkled in first and second positions.

According to a fourteenth aspect, the gap of any of the prior or subsequent aspects is defined by a center cushion and a bolster cushion of the cushion assembly.

According to a fifteenth aspect, the rigid member of any of the prior or subsequent aspects is a metal wire.

According to a sixteenth aspect, the assembly of any of the prior or subsequent aspects is disposed in a vehicle.

According to a seventeenth aspect, the assembly of any of the prior or subsequent aspects is a trim assembly. The trim assembly includes a trim and a plurality of retainers. The trim defines a seam and includes an outer surface and an inner surface. The outer surface is configured to contact an occupant and the inner surface is configured to contact a cushion assembly. The cushion assembly defines a gap configured to facilitate movement from a first position and a second position. The seam is positioned such that it bridges the gap when the trim is covering the cushion assembly. A plurality of elongated wires cooperates with the trim and a plurality of retainers to provide tension along the seam.

According to an eighteenth aspect, the retainers of any of the prior or subsequent aspects are configured to engage a seat frame and cooperate with the elongated wires via one or more elastic members disposed therebetween.

According to a twentieth aspect, the trim of any of the prior or subsequent aspects includes an outer layer and a subordinate layer. The subordinate layer is configured to cooperate with the outer layer and the plurality of retainers to provide tension along the seam.

According to a twenty-first aspect, the retainers of any of the prior or subsequent aspects are configured to cooperate with the seat frame.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A trim cover, comprising:
    a trim material comprising an outer surface configured to contact an occupant, an inner surface opposite the outer surface configured to contact a cushion assembly defining an occupant support surface, and the trim material defining a seam positioned to extend over a gap defined by the cushion assembly;
    a flap comprising a first end and a second end opposite to the first end, wherein the flap is attached to the inner surface of the trim material at the first end;
    a rigid member positioned at the second end of the flap proximate to the seam, providing stress on the trim material when arranged on a seat assembly;
    an elastic member comprising a primary end and a secondary end, such that the elastic member is coupled with the second end of the flap and the rigid member at the primary end; and
    a retainer coupled to the rigid member via the elastic member at the secondary end of the elastic member and secured to a seat frame,
    wherein the trim material has a first position and a second position, and the rigid member, coupled with the elastic member and the retainer, is configured to reinforce the seam by tensioning the trim material in the first position and the second position.

2. The trim cover of claim 1, wherein the elastic member is coupled to the seat assembly and configured to apply tension to the trim material via the rigid member.

3. The trim cover of claim 2, wherein the retainer comprising a J-hook structure is positioned opposite the rigid member with the elastic member disposed therebetween, such that the retainer is coupled to the seat frame of the seat assembly and the elastic member extends through the gap when the trim material is arranged on the seat assembly.

4. The trim cover of claim 1, further comprising a plurality of retainers cooperating with the inner surface of the trim material such that the retainer of the plurality of retainers cooperates with the rigid member when arranged on the seat assembly to apply tension to the trim material proximate the gap.

5. The trim cover of claim 1, wherein the rigid member is disposed on or in the trim material.

6. The trim cover of claim 1, wherein the rigid member is a wire, and the rigid member has a length greater than a length of the elastic member.

7. A seat assembly comprising a seat frame supporting the cushion assembly with the trim cover of claim 1 covering the cushion assembly.

8. A seat assembly comprising a seat frame supporting the cushion assembly with the trim cover of claim 1 covering the cushion assembly and a heat mat bridging the gap.

9. A seat assembly, comprising:
    a frame;
    a cushion assembly supported by the frame and defining a gap; and
    a trim cover disposed over the cushion assembly and defining a seam disposed proximate the gap, the trim cover comprising:
        a flap comprising a first end and a second end opposite to the first end, wherein the flap is attached to the trim cover at the first end;
        a rigid member positioned at the second end of the flap extending along the seam such that tension is applied to support the seam when the trim cover is in a first position and a second position;
        an elastic member comprising a primary end and a secondary end, such that the elastic member is coupled with the second end of the flap and the rigid member at the primary end; and a retainer coupled to the rigid member via the elastic member at the secondary end of the elastic member and coupled to the frame, wherein the rigid member, coupled with the elastic member and the retainer, is configured to reinforce the seam by tensioning the trim cover in the first position and the second position.

10. The seat assembly of claim 9, further comprising a massaging assembly disposed below the trim cover and extending through the gap or a heat mat disposed below the trim cover and bridging the gap.

11. The seat assembly of claim 9, wherein the first position includes one or more inflated bladders cooperating with the trim cover or an extended position where the gap is expanded, and the second position includes one or more deflated bladders cooperating with the trim cover or a retracted position where the gap is reduced.

12. The seat assembly of claim 11, wherein the first position of the trim cover accommodates an extended leg support position of the cushion assembly, and the second position of the trim cover accommodates a retracted leg support position of the cushion assembly.

13. The seat assembly of claim 9, further comprising the elastic member cooperating with the rigid member and the frame to apply the tension such that the trim cover remains unwrinkled in the first and second position.

14. The seat assembly of claim 9, wherein the gap is defined by a center cushion and a bolster cushion of the cushion assembly.

15. The seat assembly of claim 9, wherein the trim cover includes a connector extended adjacent the gap in the first position and withdrawn into the gap in the second position.

16. The seat assembly of claim 9, wherein the seat assembly is disposed in a vehicle.

17. A trim assembly, comprising:

a trim defining a seam, the trim comprising an outer surface to contact an occupant and an inner surface to contact a cushion assembly defining a gap to facilitate movement from a first position to a second position, trim cover being positioned such that it bridges the gap when covering the cushion assembly and the seam is disposed along the gap;

a flap comprising a first end and a second end opposite to the first end, wherein the flap is attached to the inner surface of the trim at the first end;

a rigid member positioned at the second end of the flap proximate to the seam to provide stress on the trim when arranged on a seat assembly;

an elastic member comprising a primary end and a secondary end, such that the elastic member is coupled with the second end of the flap and the rigid member at the primary end; and a plurality of retainers coupled to the rigid member via the elastic member at the secondary end of the elastic member and secured to a seat frame, wherein the rigid member, coupled with the elastic member and the plurality of retainer, is configured to reinforce the seam by providing tension along the seam.

18. The trim assembly of claim 17, wherein the elastic member is formed of an elastic fabric and the plurality of retainers is formed of a polymeric material, and wherein the plurality of retainers engages with the seat frame and cooperate with a elongated wires via one or more elastic members disposed therebetween when the trim is arranged on a seat assembly.

19. The trim assembly of claim 18, wherein the trim comprises an outer layer and a subordinate layer that cooperates with the outer layer and the plurality of retainers to provide the tension along the seam.

20. The trim assembly of claim 19, wherein the plurality of retainers cooperates with the seat frame when arranged on the seat assembly.

\* \* \* \* \*